Feb. 16, 1965 P. T. MARTIN 3,170,064
LIQUID LEVEL MEASURING SYSTEM
Filed May 26, 1961

INVENTOR
Philip T. Martin

ATTORNEY 3,170,064
LIQUID LEVEL MEASURING SYSTEM
Philip T. Martin, Columbus, Ohio, assignor to Industrial Nucleonics Corporation, a corporation of Ohio
Filed May 26, 1961, Ser. No. 113,008
4 Claims. (Cl. 250—43.5)

This invention relates generally to liquid level measuring systems and particularly to liquid level measuring systems wherein the tank, container or vessel is subject to movement.

The present invention is adapted particularly to the use of penetrative radiation and detector type of tank level measurement. There are many prior art systems that measure the liquid level in a vessel wherein the radiation source and detector are disposed in one form or another on opposite sides of the vessel. For general applications, this type of system has proven to be satisfactory. However, there are many liquid level containers that are not stationary, that is, the container may be a fuel tank installed on a moving vehicle, water craft or other types of carriers. As the carrier moves, the container will also move from side to side or to and fro or simply roll. Very obviously as the container rolls the liquid will seek its level. This movement of the liquid relative to the vessel makes a single or even multiple point measurement inaccurate as a true indication of liquid level.

The present invention utilizes a plurality of penetrative radiation sources and detectors in a unique manner to derive information that may be converted into a true indication of liquid level.

It is accordingly an object of the present invention to provide method and means for measuring or indicating the liquid level in a container, tank or vessel that is subject to movement.

It is a further object of the present invention to utilize the techniques of measurement using a penetrative radiation and detector.

It is also an object of the present invention to adapt the apparatus of the preferred embodiment to existing containers with only a minimum of installation and without entering the container.

Figure 1:
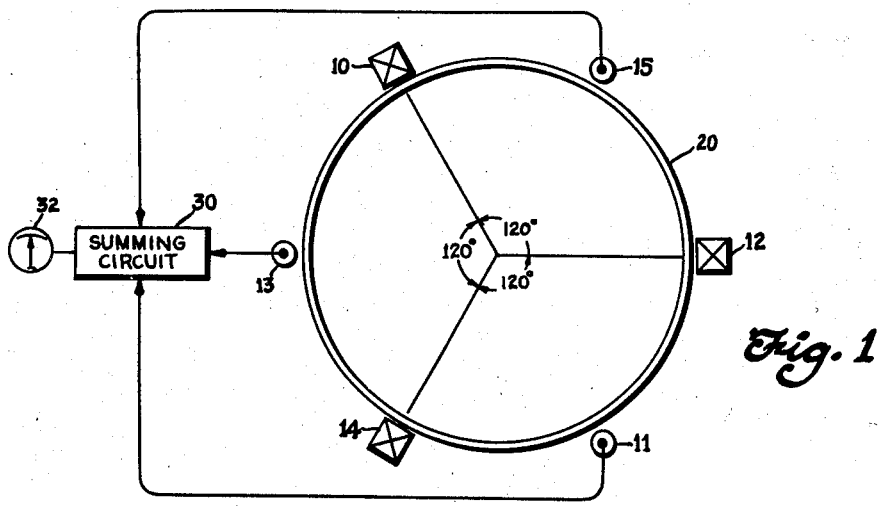
Figure 2:
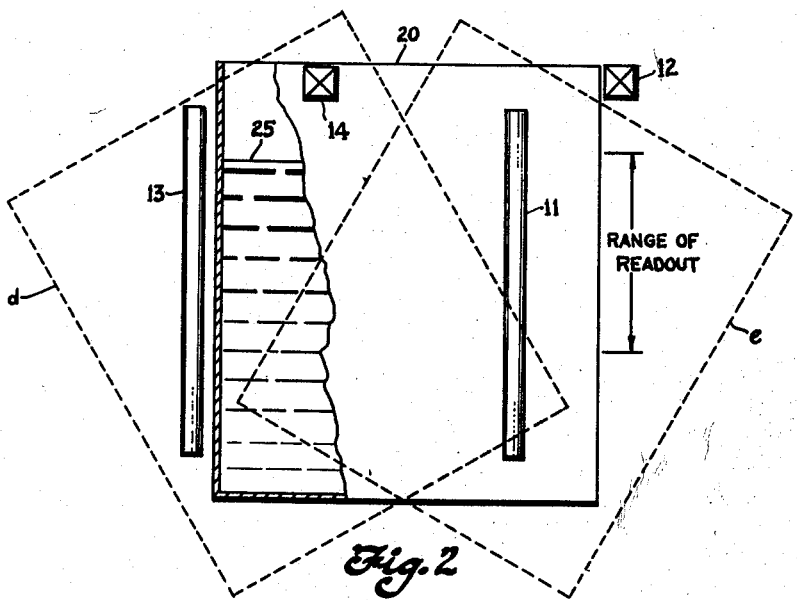

Other objects and features of the present invention will become apparent from the following detailed description when taken in conjunction with the drawings in which FIG. 1 is a top view of a liquid level measuring system for a liquid containing vessel incorporating the teachings of the present invention, and FIG. 2 is a side view of the preferred embodiment of FIG. 1.

Referring now particularly to FIGS. 1 and 2 container 20 is a standard type of vessel designed to store liquids or other fluid material 25. For inventory purposes it is necessary that the exact amount of fluid 25 in the container 20 be known at all times. If the level of the liquid were to be at $a$, prior art devices positioned on the horizontal would suffice in determining this level. However, in many instances the vessel 20 will not be stationary and will sway back and forth or to and fro or may simply roll. The level of liquid or fluid material will always seek to be on the horizontal and a source and detector normally positioned on the horizontal will no longer be on the horizontal with respect to the liquid.

The typical embodiment of FIGS. 1 and 2 preferably comprises three or more source-detector continuous level measuring systems. The sources 10, 12 and 14 are positioned on the outside of container 20 at its uppermost portion. It is desirable that these sources be located above the top fluid level of the measurement range. The detectors 11, 13, and 15 are preferably of the elongated type. The detectors are positioned adjacent the outside wall of the vessel in parallel relationship to the vertical axis of the vessel. With this positioning the detectors will extend well above and below the readout range of the liquid in the vessel. The sources 10, 12 and 14 are mounted on the opposite side of the container from the detectors 11, 13 and 15 respectively. The source-detector units are preferably equally spaced about the tank, i.e., when three units are used as shown in the preferred embodiment they will be 120° apart.

As the container rolls or moves back and forth or to and fro to that indicated by dotted lines $d$ and $e$ the volume under the surface and the tank level may be readily measured. The basis of operation is that if the level at enough points is determined the true level, i.e., the level of the fluid in a vertical container, can be derived therefrom. In the embodiment shown the liquid level container storing a free fluid material 25 will have a liquid level that is a plane. The three or more points of measurement are made on three points of the plane. The sum of their outputs or the average of the indicators gives an output which indicates the tank level independent of the tank roll. The output of the summing circuit 30 may be registered on a meter 32 calibrated in units of fill level.

The positioning of the source above the liquid level range and the detectors above and below the liquid level range, as mentioned above, is to assure that the radiation to the detector is intercepted by the fluid at the detector side of the tank and not at the source side of the tank. The sources, therefore, should be at the uppermost portion of the vessel in order to assure that all of the sources will be above the highest roll angle of the liquid. If a source were to be placed below the roll angle of the liquid, the fluid flowing up the side of the tank would intercept the radiation adjacent that particular source. If the liquid would absorb the radiation at the source side of the tank the detector on the opposite side of the tank would receive a minimum of radiation. This indication would be normally interpreted that the liquid would be at its highest level, whereas in fact on the detector side of the tank the liquid level would be at its lowest point.

The location of the source-detectors need not have a uniform spacing between each other. However, if the spacing is other than uniform the individual readouts must compensate for the variations in spacing. In some inaccessible locations such an arrangement may be desirable.

Although I have shown a certain and specific embodiment, modifications may be had thereto without departing from the true spirit and scope of the invention.

I claim:

1. In combination with a liquid storage vessel to be mounted on a carrier subject to movement such as roll, pitch, yaw or accelerations, in a number of directions, to cause the liquid surface to have three-dimensional movement, wherein the fill level of said liquid may vary from a low level to a high level as observed in the absence of said movement and while said vessel occupies a normal upright position, apparatus for measuring the true value of said fill level in the presence or absence of said movement, said apparatus comprising three elongated radiation detectors spaced around the periphery of said vessel and each extending from above said high level to below said low level, means located above said high level for irradiating those portions of said detectors which are above the surface of said liquid whereby each of said detectors generates a signal indicative of the height of a respective point in the plane of the surface of said liquid, and means for combining the signals from said three detectors to produce a resultant signal indicative of said true value of said fill level.

2. In combination with a liquid storage vessel to be mounted on a carrier subject to movement such as roll, pitch, yaw or acceleration, in a number of directions, to cause the liquid surface to have three-dimensional movement, wherein the fill level of said liquid may vary from a low level to a high level as observed in the absence of said movement and while said vessel occupies a normal upright position, apparatus for measuring the true value of said fill level in the presence or absence of said movement, said apparatus comprising three elongated radiation detectors spaced around the periphery of said vessel and each extending from above said high level to below said low level, a plurality of radiation sources located above said high level and spaced around the periphery of said vessel for irradiating those portions of said detectors which are above the surface of said liquid whereby each of said detectors generates a signal indicative of the height of a respective point in the plane of the surface of said liquid, and means for combining the signals from said three detectors to produce a resultant signal indicative of said true value of said fill level.

3. In combination with a liquid storage vessel to be mounted on a carrier subject to movement such as roll, pitch, yaw or acceleration, in a number of directions, to cause the liquid surface to have three-dimensional movement, wherein the fill level of said liquid may vary from a low level to a high level as observed in the absence of said movement and while said vessel occupies a normal upright position, apparatus for measuring the true value of said fill level in the presence or absence of said movement, said apparatus comprising three elongated radiation detectors spaced around the periphery of said vessel and each extending from above said high level to below said low level, three radiation sources mounted above said high level and spaced around the periphery of said vessel, one of said sources being located between each pair of the axes of said detectors for irradiating those portions of said detectors which are above the surface of said liquid whereby each of said detectors generates a signal indicative of the height of a respective point in the plane of the surface of said liquid, and means for combining the signals from said three detectors to produce a resultant signal indicative of said true value of said fill level.

4. In combination with a cylindrical liquid storage vessel to be mounted on a carrier having a generally upright axis, said vessel being subject to movement such as roll, pitch, yaw or acceleration, in a number of directions to cause the liquid surface to have three-dimensional movement, wherein the fill level of said liquid may vary from a low level to a high level as observed in the absence of said movement and while said vessel occupies a normal upright position, apparatus for measuring the true value of said fill level in the presence or absence of said movement, said apparatus comprising three elongated radiation detectors equally spaced around the periphery of said vessel and each extending in a direction parallel to said axis from above said high level to below said low level, three radiation sources mounted above said high level and equally spaced around the periphery of said vessel between the axes of said detectors for irradiating those portions of said detectors which are above the surface of said liquid whereby each of said detectors generates a signal indicative of the height of a respective point in the plane of the surface of said liquid, and a summing circuit for combining the signals from said three detectors to produce a resultant signal indicative of said true value of said fill level.

References Cited in the file of this patent

UNITED STATES PATENTS

| 2,734,136 | Atchison | Feb. 7, 1956 |
| 2,737,592 | Ohmart | Mar. 6, 1956 |
| 2,922,884 | Fearnside | Jan. 26, 1960 |
| 2,953,682 | Frank et al. | Sept. 20, 1960 |
| 2,960,607 | Kohl | Nov. 15, 1960 |

FOREIGN PATENTS

| 547,196 | Belgium | May 15, 1956 |